United States Patent
Sun

(10) Patent No.: US 9,749,201 B2
(45) Date of Patent: Aug. 29, 2017

(54) METHOD AND SYSTEM FOR MONITORING LOCATOR/IDENTIFIER SEPARATION NETWORK

(75) Inventor: Yizhou Sun, Shenzhen (CN)

(73) Assignee: ZTE Corporation (CN)

( * ) Notice: Subject to any disclaimer, the term of this patent is extended or adjusted under 35 U.S.C. 154(b) by 519 days.

(21) Appl. No.: 13/991,302

(22) PCT Filed: Apr. 25, 2011

(86) PCT No.: PCT/CN2011/073273
§ 371 (c)(1),
(2), (4) Date: Jun. 3, 2013

(87) PCT Pub. No.: WO2012/075768
PCT Pub. Date: Jun. 14, 2012

(65) Prior Publication Data
US 2013/0262672 A1    Oct. 3, 2013

(30) Foreign Application Priority Data
Dec. 6, 2010   (CN) .......................... 2010 1 0574501

(51) Int. Cl.
*G06F 15/173* (2006.01)
*H04L 12/26* (2006.01)
(Continued)

(52) U.S. Cl.
CPC .............. *H04L 43/04* (2013.01); *H04L 63/08* (2013.01); *H04L 41/12* (2013.01); *H04L 45/42* (2013.01)

(58) Field of Classification Search
CPC ....... H04L 61/1511; H04L 45/00; H04L 63/08
See application file for complete search history.

(56) References Cited

U.S. PATENT DOCUMENTS 8,793,361 B1 * 7/2014 Riddle ................ H04L 47/2441
                                                            709/224
2007/0271598 A1 * 11/2007 Chen et al. ...................... 726/4
(Continued)

FOREIGN PATENT DOCUMENTS

CN          1801764        7/2006
CN         101656656       2/2010
(Continued)

OTHER PUBLICATIONS

Japanese Patent Application No. 2013-541186, Office Action dated Jul. 11, 2014.
(Continued)

*Primary Examiner* — Yves Dalencourt
(74) *Attorney, Agent, or Firm* — Brooks Kushman P.C.

(57) ABSTRACT

A method and system for monitoring a locator/identifier separation network. The method includes: a supervision center sending identity information of a monitored to an authentication center, querying and obtaining an identity identifier of the monitored; the supervision center obtaining a location identifier of the monitored according to the identity identifier of the monitored; the supervision center sending a command of monitoring the identity identifier of the monitored to an edge router corresponding to the location identifier of the monitored; and the edge router mirroring a data packet containing the identity identifier of the monitored in address information to the supervision center. With the method and system for monitoring the locator/identifier separation network, a monitoring function under a locator/identifier separation network architecture can be implemented.

10 Claims, 2 Drawing Sheets

(51) Int. Cl.
*H04L 29/06* (2006.01)
*H04L 12/717* (2013.01)
*H04L 12/24* (2006.01)

(56) References Cited

U.S. PATENT DOCUMENTS

2010/0208742 A1\* 8/2010 Kafle et al. .................. 370/401
2010/0316054 A1 12/2010 Xu et al.
2011/0261800 A1 10/2011 You et al.
2012/0040690 A1 2/2012 Zhao et al.

FOREIGN PATENT DOCUMENTS

| | | |
|---|---|---|
| CN | 101730101 | 6/2010 |
| EP | 2178265 A1 | 4/2010 |
| JP | 2001177577 | 6/2001 |
| WO | 2006087819 A1 | 8/2006 |
| WO | 2008140113 | 11/2008 |
| WO | 2009044472 A1 | 4/2009 |
| WO | 2010074512 | 7/2010 |

OTHER PUBLICATIONS

International Search Report for PCT/CN2011/073273, English translation attached to original, Both completed by the Chinese Patent Office on Jul. 21, 2011, All together 6 Pages.

\* cited by examiner

201 — A supervision center sends identity information of a monitored to an authentication center, queries and obtains an identity identifier of the monitored 202 — The supervision center obtains a location identifier of the monitored according to the identity identifier of the monitored 203 — The supervision center sends a command of monitoring the identity identifier of the monitored to an edge router corresponding to the location identifier of the monitored 204 — The edge router mirrors a data packet containing the identity identifier of the monitored in address information to the supervision center

FIG. 2

METHOD AND SYSTEM FOR MONITORING LOCATOR/IDENTIFIER SEPARATION NETWORK

CROSS-REFERENCE TO RELATED APPLICATION

This application is the U.S. national phase of PCT Application No. PCT/CN2011/073273 filed on Apr. 25, 2011, which claims priority to Chinese Patent Application No. 201010574501.2 filed on Dec. 6, 2010, the disclosures of which are incorporated in their entirety by reference herein.

TECHNICAL FIELD

The present document relates to the field of data communication, and particularly, to a method and system for monitoring a locator/identifier separation network.

BACKGROUND OF THE RELATED ART

The research on the next generation information network architecture is one of the hottest subjects at the present, and a viewpoint accepted by most researches currently is that the future network will take the Internet as a uniform bearer network. The Internet has maintained a rapid development since it came forth, and has become the most successful and vital communication network, its characteristics such as flexible extendibility, efficient packet switching and powerful terminal functions and so on strongly meet the design demands of the new generation of the networks, and the Internet will be a main reference blueprint of the new generation of the network designs.

However, the structure of the Internet is still far from the optimum and has many significant design problems, wherein a comparatively typical problem is a problem of dual attributes of IP address, that is, the IP address represents a user identity and also represents a network topology where a user is located, and this is the dual attributes of IP address. The Internet is invented in the 1970s, it was difficult for the people at that time to expect that large quantities of mobile terminals and multi-homing terminals would exist in the world today, thus internet protocol stacks at that time were designed with respect to terminals connected in a fixed way. In the temporal network environment, since a terminal generally would not move from one location to other locations, and a sending address was exactly a receiving address, and the path was reversible, an IP address with dual attributes of identity and location could work extremely well, and no conflict was generated between the identity attribute and the location attribute of the IP address. The IP address representing both the identity and location simultaneously met the temporal network requirements precisely. Seen from the temporal network environment, this design scheme was simple and effective, which simplified the hierarchical structure of the protocol stacks.

Nonetheless, it is undoubted that inner contradictions exist between the identity attribute and the location attribute of the IP address; the identity attribute of the IP address requires that two arbitrary IP addresses should be equal, though the IP addresses can be allocated according to an organizational structure, there is no inevitable relationship between the IP addresses coded sequentially; the location attribute of the IP address requires that the IP addresses should be allocated based on the network topology (but not the organizational structure), and all IP addresses located within the same subnetwork should be located in a sequential IP address block, thus IP address prefixes in the network topology can be aggregated, thereby reducing entries of routing tables of a router device and guaranteeing the extendibility of a routing system.

In general, the inner contradictions of the dual attributes of IP address will cause the following major problems.

1. Route extendibility problem. A basic assumption exists with regard to the extendibility of the routing system in the Internet:

The addresses are allocated according to the topology, or the topology is deployed according to the addresses, it has to select one between the two. The identify attribute of the IP address requires that the IP addresses be allocated based on the organizational structure to which the terminal belongs (but not the network topology), and this kind of allocation is required to keep a certain stability and cannot be changed frequently; and the location attribute of the IP address requires that the IP addresses be allocated based on the network topology, so as to guarantee the extendibility of the routing system. Therefore, the two attributes of IP address generate a conflict, which eventually triggers the extendibility problem of the routing system in the Internet.

2. Mobility problem. The identify attribute of the IP address requires that the IP addresses should not be changed with the change of locations of the terminal, thus it can guarantee that communications bound with the identities are not interrupted, and it also can guarantee that other terminals still can use the identity of the terminal to establish a communication relation with the terminal after the terminal moves; and the location attribute of the IP address requires that the IP addresses should be changed with the change of locations of the terminal, such that the IP addresses can be aggregated in a new network topology, otherwise the network must maintain separate routing information for the moved terminal, thereby causing that the number of entries of the routing table increases sharply.

3. Multi-homing problem. The multi-homing normally refers to that the terminal or network accesses the Internet through multiple international Internet Services Providers (ISP) simultaneously, the advantages of the multi-homing technology include increasing reliability of the network, supporting traffic load balancing between multiple ISPs and improving the overall available bandwidth and so on. However, the inner contradictions of the dual attributes of IP address make it difficult to implement the multi-homing technology. The identify attribute of the IP address requires that a multi-homing terminal should always reveal an unchanged identity to other terminals, no matter how many ISPs through which the multi-homing terminal accesses the Internet are; and the location attribute of the IP address requires that a multi-homing terminal should use different IP addresses to communicate in different ISP networks, thus it can guarantee that IP addresses of the terminal can be aggregated in the topology of the ISP network.

4. Security and location privacy problem. Since the IP address simultaneously contains identity information and location information of the terminal, both a communication opposite terminal and a malevolent listener can simultaneously obtain the identity information and topology location information of the terminal according to an IP address of one terminal.

In general, since the architecture of the traditional Internet has been established, the technological environment and user group of the Internet has great changes, and the Internet is required to perform innovation along with the changes. The problem of dual attributes of IP address is one of primary causes that perplex the sustainable development of the Internet, separating the identity attribute and the location attribute of the IP address is a good idea of solving the problem which the Internet faces. A new network will be design based on this idea and put forward a network structure in which the identity information and the location information are mapped separately, so as to solve certain serious defects existing in the existing Internet.

In order to solve the problem of identity and location, the industry makes a mass of researches and explorations, and all the basic ideas of schemes for separating the identity and location are to separate the dual attributes of identity and location originally bound with the IP address. Wherein, certain schemes use a Uniform Resource Locator (URL, it is an identification method used for completely describing addresses of other resources and webpages in the Internet) of an application layer or a Fully Qualified Domain Name (FQDN) to serve as an identify identifier of the terminal; certain schemes introduce a new name space to serve as the identity identifier, such as a Host Identity Protocol (Host Identity Protocol), and add a host identity on a network layer using the IP address as the identifier; certain schemes perform classification on the IP addresses, part of IPs are taken as identity identities, and part of IPs are taken as location identifiers, such as a Locator/ID Separation Protocol (LISP) and so on; and the patent CN200610001825 of Hong-Ke Zhang from the Northern Jiaotong University also puts forward a scheme in which the IP address is used to serve as the location identifier of the host and a terminal host identifier is introduced to serve as the identity identifier, which solves the problem of a separation between an identity and a location.

All the above schemes put forward the schemes for implementing the separation between an identity and a location in the existing network architecture from certain parts of the problem, and the separation between an identity and a location is a core technology of the future data communication network, especially a mobile data communication network.

In the existing locator/identifier separation technology, it is required to establish a mapping relation between the identity identifier and the location identifier to be used when the network device performs addressing. This mapping relation is maintained in a mapping server, an edge router receives a data packet from the terminal, and if a target identity identifier of the data packet is unknown, it is required to query a locator/identifier mapping table of the mapping server, find a target location identifier according to the target identity identifier, encapsulate the data packet and then send the encapsulated data packet to a corresponding network.

Services of the Internet network include Internet browsing, e-mail receiving and sending, instant messaging, video upload and download and so on, sources of the information are extensive, and the state security and social stability may even be harmed, thus carrying out lawful interceptions on the Internet network has an important significance.

A monitoring function is mainly to acquire and record communication data of a monitored object in the way of bypass, and provide the communication data to state security departments such as the public security and the army and so on.

The monitoring function of the network is required to possess the following characteristics:

1. The monitored object can be a certain user, a certain terminal, a certain service provider or a certain service;

2. The data are acquired in the way of bypass during the monitoring, which does not influence the service and is not perceived by the user;

3. The monitoring is required to obtain an authorization, and supervision departments with different authorities monitor contents of different levels.

The definitions of the monitoring function of the network are limited at the network layer of the ISO seven layer model, that is, according to a set monitoring rule, data packets of the network layer matching the condition are mirrored to a supervision center.

During the implementation of the monitoring function, a data mirroring function of the network device is mainly utilized; the data mirroring function is to copy data of a source port and data screened out according to rules of an access control list to a destination port, and the destination port is connected to a data monitoring device of the supervision center. Currently, most of the network devices such as a switch, a router and an access server and so on all support a port mirroring function.

Currently, in the existing locator/identifier separation network architecture, the monitoring function is not implemented.

SUMMARY OF THE INVENTION

The technical problem required to be solved by the present document is to provide a method and system for monitoring a locator/identifier separation network, which implements a monitoring function under a locator/identifier separation network architecture.

In order to solve the above technical problem, the present document provides a method for monitoring a locator/identifier separation network, which comprises:

a supervision center sending identity information of a monitored to an authentication center, querying and obtaining an identity identifier of the monitored;

the supervision center obtaining a location identifier of the monitored according to the identity identifier of the monitored;

the supervision center sending a command of monitoring the identity identifier of the monitored to an edge router corresponding to the location identifier of the monitored; and the supervision center receiving a data packet containing the identity identifier of the monitored in address information mirrored by the edge router.

Preferably, the approach of the supervision center obtaining a location identifier of the monitored according to the identity identifier of the monitored is: according to the identity identifier of the monitored, the supervision center querying a mapping relation between the identity identifier of the monitored and the location identifier of the monitored in a mapping server, and obtaining the location identifier of the monitored.

Preferably, the approach of the supervision center obtaining a location identifier of the monitored according to the identity identifier of the monitored is: according to the mapping relation between the identity identifier of the monitored and the location identifier of the monitored stored by the supervision center itself, the supervision center obtaining the location identifier of the monitored.

Preferably, the approach of the supervision center obtaining a location identifier of the monitored according to the identity identifier of the monitored further comprises: the supervision center interacting with the mapping server in advance, obtaining and storing the mapping relation between the identity identifier of the monitored and the location identifier of the monitored;

Preferably, the identity information of the monitored comprises one or any combination of the following: an account number, a phone number and an identity card number of the monitored.

In order to solve the above technical problem, the present document further provides a system for monitoring a locator/identifier separation network, which comprises: a monitored, a supervision center, an authentication center and an edge router, wherein:

the supervision center is configured to: send identity information of the monitored to the authentication center, query and obtain an identity identifier of the monitored; according to the identity identifier of the monitored, obtain a location identifier of the monitored; and send a command of monitoring the identity identifier of the monitored to an edge router corresponding to the location identifier of the monitored;

the authentication center is configured to: according to the identity information of the monitored sent by the supervision center, feed the identity identifier of the monitored back;

the edge router is configured to: mirror a data packet containing the identity identifier of the monitored in address information to the supervision center.

Preferably, the supervision center is further configured to: according to the identity identifier of the monitored, query a mapping relation between the identity identifier of the monitored and the location identifier of the monitored in a mapping server, and obtain the location identifier of the monitored.

Preferably, the supervision center is further configured to: according to the mapping relation between the identity identifier of the monitored and the location identifier of the monitored stored by the supervision center itself, obtain the location identifier of the monitored.

Preferably, the supervision center is further configured to: interact with the mapping server in advance, obtain and store the mapping relation between the identity identifier of the monitored and the location identifier of the monitored.

Preferably, the identity information of the monitored comprises one or any combination of the following: an account number, a phone number, an identity card number or other identity information in realistic society of the monitored.

The present document further provides a supervision center for a locator/identifier separation network, the supervision center is configured to: send identity information of a monitored to an authentication center, query and obtain an identity identifier of the monitored; according to the identity identifier of the monitored, obtain a location identifier of the monitored; and send a command of monitoring the identity identifier of the monitored to an edge router corresponding to the location identifier of the monitored;

wherein the authentication center feeds the identity identifier of the monitored back; and the supervision center receives a data packet containing the identity identifier of the monitored in address information mirrored by the edge router.

Preferably, the supervision center is further configured to: according to the identity identifier of the monitored, query a mapping relation between the identity identifier of the monitored and the location identifier of the monitored in a mapping server, and obtain the location identifier of the monitored.

Preferably, the supervision center is further configured to: according to the mapping relation between the identity identifier of the monitored and the location identifier of the monitored stored by the supervision center itself, obtain the location identifier of the monitored.

Preferably, the supervision center is further configured to: interact with the mapping server in advance, obtain and store the mapping relation between the identity identifier of the monitored and the location identifier of the monitored.

Preferably, the identity information of the monitored comprises one or any combination of the following: an account number, a phone number, an identity card number or other identity information in realistic society of the monitored.

A beneficial effect generated by the present document is that: the present document discloses a method for monitoring the locator/identifier separation network, which implements the monitoring function under the locator/identifier separation network architecture.

BRIEF DESCRIPTION OF DRAWINGS

Here, the described accompanying drawings are used to provide a further understanding of the present document and constitute a part of the present document. The schematic examples and illustrations thereof of the present document are used to explain the present document, but do not constitute an inappropriate limitation to the present document. In the drawings:

FIG. 2 is a flow diagram of monitoring by the supervision center according to the example 2 of the present document.

PREFERRED EMBODIMENTS OF THE INVENTION

Figure 1:
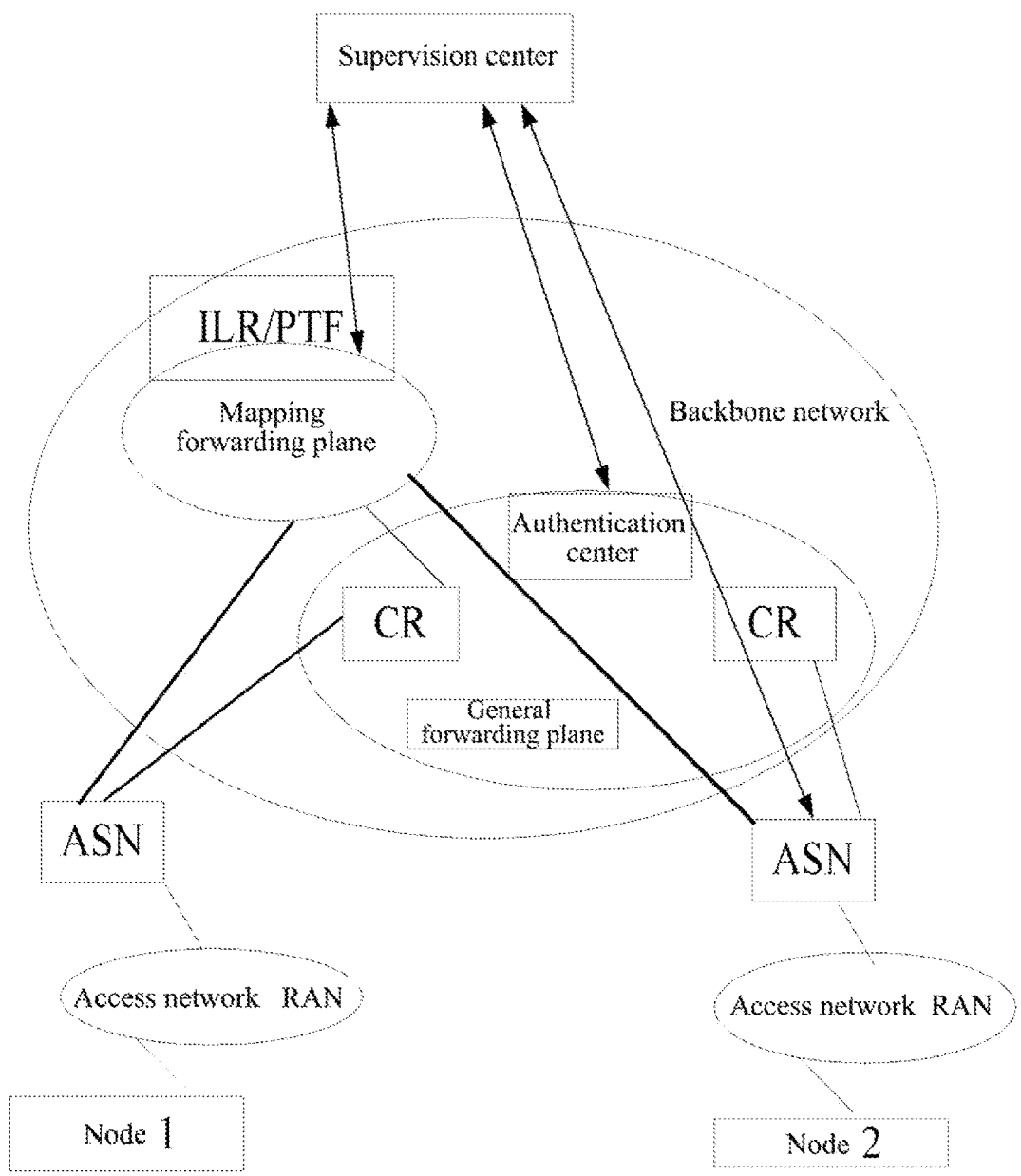
FIG. 1 is a schematic diagram of an applied network topology based on the locator/identifier separation architecture according to the example 1 of the present document.

In order to make the object, technical scheme and advantages of the present document more clear, the present document is further described in detail in combination with the accompanying drawings below. It should be noted that the examples in the present document and the characteristics in the examples can be combined with each other in the condition of no conflict.

FIG. 1 is a schematic diagram of an applied network topology based on the locator/identifier separation architecture according to the example 1 of the present document, and the specific description is shown as follows:

the network is divided into an access layer and a backbone layer, a unique host access identifier AID is allotted to each user in the network, and the host access identifier AID keeps unchanged in a movement process; the network has two kinds of identifier types: the host access identifier AID and a route identifier RID, wherein, the host access identifier AID can only be used at the access layer, and the route identifier RID can only be used at the backbone layer.

Under the framework, the network is divided into an access network and a backbone network, the access network is located at the edge of the backbone network and is responsible for accessing by all terminals; the backbone network is responsible for routing of terminals which access through different access networks. An Access Service Node (ASN) is located at a boundary point between the backbone network and the access network, and it is interfaced with both the access network and the backbone network. The access network and the backbone network are not overlapped in a topological relation. When the communication is performed between user terminals, it is only required to use a host access identifier of the opposite terminal. The access service node provides access services for the terminals, maintains user connections, and forwards user data.

When the backbone network of the architecture is networking, it is divided into two planes: a mapping forwarding plane and a general forwarding plane.

A main function of the general forwarding plane is to route and forward data messages according to a route identifier RID in the data message; and a main function of the mapping forwarding plane is to save mapping information of the identity and location of a mobile node, process a registration flow of the mobile node, process a location query flow of a correspondent node, route and forward data messages with an access identifier AID as a destination address.

Main network elements and function entities of the architecture include:

Access Service Node (ASN): the ASN maintains a connection relation between the terminal and the network, allocates an RID to the terminal, processes a handover flow, processes a registration flow, processes a charging/authentication flow, maintains and queries an AID-RID mapping relation of the correspondent node.

The ASN encapsulates, routes and forwards the data messages sent to the terminal or the data messages sent by the terminal.

When receiving a data message sent by a terminal Mobile Node (MN), the ASN queries an AID-RID mapping table in the local cache according to an AIDc of a destination address Correspondent Node (CN) in the data message: if a corresponding AIDc-RIDc mapping entry is found, the ASN takes an RIDc as a destination address to be encapsulated into a message header, takes an RIDm corresponding to a source address AIDm of the MN as a source address to be encapsulated into the message header, and forwards the source address to the general forwarding plane; if no corresponding AIDc-RIDc mapping entry is found, the ASN performs tunnel encapsulation on the data message and then forwards the data message to the mapping forwarding plane, and sends a flow of querying an AIDc-RIDc mapping relation to the mapping forwarding plane.

When receiving a data message sent by the network to the terminal, the ASN de-encapsulates the data message, straps the RID encapsulation of the data message header, and reserves the AID as the data message header to be sent to the terminal.

Common Router (CR): it routes and forwards the data messages with the source address/destination address being in an RID format, and there is no difference between functional roles of the common router and functional roles of a router in the related art.

Identity Location Register/Packet Transfer Function (ILR/PTF): ILR is an identity location register and maintains/saves the AID-RID mapping relation between users in the network architecture, it implements a registration function and processes a location query flow for the correspondent node; PTF is a packet transfer function. After the mapping forwarding plane receives the data message sent by the ASN, the PTF routes and forwards the data messages within the mapping forwarding plane according to a destination AID. After finding a destination AID-RID mapping relation, a PTF node within the mapping forwarding plane encapsulates corresponding RID information into the data message header and forwards the RID information to the general forwarding plane, and the general forwarding plane routes and forwards the RID information to the correspondent node.

Authentication center: the authentication center is responsible for recording user attributes including information such as a user type, authentication information and a user service level and so on of the network architecture, generating user security information used for authentication, integrity protection and encryption, and performing access control and authorization during the user access. The authentication center supports a bi-directional authentication between the terminal and the network.

In the architecture based on the locator/identifier separation, the access identifier AID of the terminal user during a valid and legitimate existence always keeps unchanged. The route identifier RID indicates an ASN location in which the terminal is located currently. According to the service needs, the ASN can allocate one or multiple dedicated RIDs to one terminal and register to the mapping forwarding plane; and the ASN also can allocate the same RID to multiple terminals. When the terminal user accesses the network, an authenticity of the identity identifier is guaranteed through the authentication of the authentication center, and the identity location register saves the AID-RID mapping relation of each node. The access network part uses the access identifier AIDs for different nodes distinctively, a general switching plane uses the RID to route the data message, and it is required to use the access identifier AID to search for the route identifier RID of the corresponding user during all processes of establishing end-to-end communications. In the end-to-end communication processes, it is required to use the access identifier AID of the local terminal as a source terminal address to be carried in the data message to the correspondent node. The correspondent node can obtain a source terminal identity from the source terminal address carried in the data message.

The network performs uses a network credit to guarantee authenticity and reliability of the user identity through the authentication on the user identity and constructs a trust domain in the network. The method for the network authenticating the user identity can use different ways according to different network systems, it can directly authenticate the access identifier AID of the user; it also can perform authentication on other types of user identifications (such as International Mobile Subscriber Identification (IMSI) and Network User Identification (NAI) and so on) for identifying the user in the network, and the network device will save a corresponding relation between the user identification and the AID.

The existing Radio Access Network (RAN) part can guarantee the layer 2 connection security and guarantee that the data message is not tampered when the terminal user accesses the network. For example, Code Division Multiple Access (CDMA) uses a way of code division multiple access; Asymmetric Digital Subscriber Line (ADSL) uses a way of special line isolation, Global System for Mobile communications (GSM) uses a way of frequency division multiple access; and all terminal users are valid and legitimate network users passing the authentication.

When the terminal user accesses the network, a point-to-point connection relation between the terminal user and the access management device ASN of the network will be established. The ASN binds the AID of the terminal user to an end-to-end user connection between the terminal and the ASN, and if a source address of a message sent over the user connection is not matched with the AID of the user, the ASN will discard the data message, thus it can be guaranteed that the AID of the terminal user will not be tampered and changed based on the locator/identifier separation architecture.

The ASN, communication device ILR/PTF between the source terminal ASN and the destination terminal ASN, CR and authentication center and so on are provided by a network operation and management party, and the network credit guarantees the transmission security for the data message and guarantees the authenticity and reliability of the data message.

A supervision center sends identity information of the monitored to the authentication center, queries and obtains an identity identifier of the monitored; according to the identity identifier of the monitored, obtains a location identifier of the monitored; and sends a command of monitoring the identity identifier of the monitored to an edge router corresponding to the location identifier of the monitored.

There are several approaches for the supervision center obtaining the location identifier of the monitored below.

In the first approach, according to the identity identifier of the monitored, the supervision center queries a mapping relation between the identity identifier of the monitored and the location identifier of the monitored in a mapping server, and obtains the location identifier of the monitored.

In the second approach, the supervision center interacts with the mapping server in advance, obtains and stores the mapping relation between the identity identifier of the monitored and the location identifier of the monitored; and according to the mapping relation stored by itself, the supervision center obtains the location identifier of the monitored.

FIG. 2 is a flow diagram of monitoring by the supervision center according to the example 2 of the present document, and the following steps are included.

In step 201, the supervision center sends identity information of the monitored to an authentication center, queries and obtains an identity identifier of the monitored.

The identity information of the monitored includes one or any combination of the following: an account number, a phone number, an identity card number of the monitored.

In step 202, the supervision center obtains a location identifier of the monitored according to the identity identifier of the monitored.

There are several approaches for the supervision center obtaining the location identifier of the monitored below.

In the first approach, according to the identity identifier of the monitored, the supervision center queries a mapping relation between the identity identifier of the monitored and the location identifier of the monitored in a mapping server, and obtains the location identifier of the monitored.

In the second approach, the supervision center interacts with the mapping server in advance, obtains and stores the mapping relation between the identity identifier of the monitored and the location identifier of the monitored; and according to the mapping relation stored by itself, the supervision center obtains the location identifier of the monitored.

In step 203, the supervision center sends a command of monitoring the identity identifier of the monitored to an edge router corresponding to the location identifier of the monitored.

In step 204, the edge router mirrors a data packet containing the identity identifier of the monitored in address information to the supervision center.

The technical scheme of system provided in the example of the present document includes: a monitored, a supervision center, an authentication center and an edge router, wherein:

the supervision center is used to: send identity information of the monitored to the authentication center, query and obtain an identity identifier of the monitored; according to the identity identifier of the monitored, obtain a location identifier of the monitored; and send a command of monitoring the identity identifier of the monitored to an edge router corresponding to the location identifier of the monitored;

the authentication center is used to: according to the identity information of the monitored sent by the supervision center, feed the identity identifier of the monitored back.

The edge router is used to: mirror a data packet containing the identity identifier of the monitored in address information to the supervision center.

Furthermore, the supervision center is also used to: according to the identity identifier of the monitored, query a mapping relation between the identity identifier of the monitored and the location identifier of the monitored in a mapping server, and obtain the location identifier of the monitored.

Furthermore, the supervision center is also used to: interact with the mapping server in advance, obtain and store the mapping relation between the identity identifier of the monitored and the location identifier of the monitored; and according to the mapping relation stored by itself, obtain the location identifier of the monitored.

Furthermore, the identity information of the monitored includes one or any combination of the following: an account number, a phone number, an identity card number or other identity information in realistic society of the monitored.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above examples also can be implemented by using one or multiple integrated circuits. Correspondingly, each module/unit in the above examples can be implemented in a form of hardware, and also can be implemented in a form of software function module. The present document is not limited to any combination of hardware and software in a specific form.

Certainly, the present document can still have other various examples, the skilled familiar to the art can make various corresponding changes and transformations according to the present document without departing from the spirit and essence of the present document, and these corresponding changes and transformations shall all fall into the protection scope of the appended claims of the present document.

INDUSTRIAL APPLICABILITY

A method for monitoring a locator/identifier separation network is disclosed in the present document, which implements a monitoring function under a locator/identifier separation network architecture.

What is claimed is:
1. A method for monitoring a locator/identifier separation network comprising:
 receiving, by an access service node (ASN), a data packet from a mobile node (MN), wherein, the data packet comprises a source address and a destination address, the source address comprises an identity identifier of the MN and the destination address comprises an identity identifier of a correspond node (CN);
 querying a mapping table of identity identifiers and location identifiers according to the identity identifier of the

MN and the identity identifier of the CN to find corresponding location identifiers;

taking a location identifier of the ASN as the source address and taking a location identifier of a destination ASN accessed by the CN as the destination address to be encapsulated into a header of the data packet, and then routing the data packet to the destination ASN through a general forwarding plane;

when a supervision center wants to monitor data packets of one MN which can be the MN or the CN and acts as a monitored MN, sending, by the supervision center, identity information of the monitored MN to an authentication center of the locator/identifier separation network, querying and obtaining an identity identifier of the monitored MN;

querying, by the supervision center, the mapping table of identity identifiers and location identifiers according to the identity identifier of the monitored MN, and obtaining from the mapping table, by the supervision center, a location identifier, which corresponds to the identity identifier of the monitored MN, of a corresponding ASN accessed by the monitored MN;

sending, by the supervision center, a command of monitoring the monitored MN to the corresponding ASN according to the location identifier of the corresponding ASN; and sending, by the ASN, a mirrored data packet corresponding to the data packet in which address information contains the identity identifier of the monitored MN to the supervision center.

2. The method according to claim 1, wherein, the step of obtaining from the mapping table a location identifier, which corresponds to the identity identifier of the monitored MN, of a corresponding ASN accessed by the monitored MN, comprises: searching, by the supervision center, the mapping table of the identity identifiers and the location identifiers in a mapping server, and then obtaining the location identifier of the corresponding ASN from the mapping table.

3. The method according to claim 1, wherein, the step of obtaining from the mapping table a location identifier, which corresponds to the identity identifier of the monitored MN, of a corresponding ASN accessed by the monitored MN, comprises: searching, by the supervision center, the mapping table of the identity identifiers and the location identifiers pre-stored in the supervision center, and then obtaining the location identifier of the corresponding ASN from the mapping table according to the identity identifier of the monitored MN.

4. The method according to claim 3, wherein, before the supervision center obtains the location identifier of the monitored MN according to the mapping table of the identity identifiers and the location identifiers pre-stored in the supervision center, the method further comprises:

interacting, by the supervision center, with a mapping server in advance, then obtaining and storing the mapping table of the identity identifiers and the location identifiers.

5. The method according to claim 1, wherein, the identity information of the monitored MN comprises one or any combination of the following: an account number, a phone number, an identity card number or other identity information in realistic society.

6. A system for monitoring a locator/identifier separation network comprising: a supervision center and the locator/identifier separation network which includes an access network, an access service node (ASN) and an authentication center, wherein:

the ASN is configured to:
receive a data packet from a mobile node (MN), wherein, the data packet comprises a source address and a destination address the source address corn rises an identity identifier of the MN and the destination address comprises an identity identifier of a correspond node (CN);

query a mapping table of identity identifiers and location identifiers according to the identity identifier of the MN and the identity identifier of the CN to find corresponding location identifiers;

take a location identifier of the ASN as the source address and take a location identifier of a destination ASN accessed by the CN as the destination address to be encapsulated into a header of the data packet, and then route the data packet to the destination ASN through a general forwarding plane;

the supervision center is configured to:
when monitoring data packets of one MN which can be the MN or the CN and acts as a monitored MN, send identity information of the monitored MN to the authentication center, query and obtain an identity identifier of the monitored MN;

query the mapping table of identity identifiers and location identifiers according to the identity identifier of the monitored MN, and obtain from the mapping table a location identifier, which corresponds to the identity identifier of the monitored MN, of a corresponding ASN accessed by the monitored MN; and send a command of monitoring the monitored MN to the corresponding ASN according to the location identifier of the corresponding ASN;

the authentication center is configured to: according to the identity information of the monitored MN sent by the supervision center, feed the identity identifier of the monitored MN back to the supervision center; and the ASN is further configured to: mirror a data packet which contains the identity identifier of the monitored MN, and send the mirrored data packet with the identity identifier of the monitored MN contained in address information of the mirrored data packet to the supervision center.

7. The system according to claim 6, wherein, the supervision center is further configured to: according to the identity identifier of the monitored MN, search the mapping table of the identity identifiers and the location identifiers in a mapping server in the locator/identifier separation network, and then obtain the location identifier of the corresponding ASN from the mapping table.

8. The system according to claim 6, wherein, the supervision center is further configured to: search the mapping table of the identity identifiers and the location identifiers pre-stored in the supervision center, and then obtain the location identifier of the corresponding ASN from the mapping table according to the identity identifier of the monitored MN.

9. The system according to claim 8, wherein, the supervision center is further configured to: interact with a mapping server in the locator/identifier separation network in advance, then obtain and store the mapping table of the identity identifiers and the location identifiers.

10. The system according to claim 6, wherein, the identity information of the monitored MN comprises one or any combination of the following: an account number, a phone number, an identity card number or other identity information in realistic society.

* * * * *